April 23, 1940.   G. ROBERTS, JR., ET AL   2,198,553
METHOD OF MAKING A SYNTHESIS GAS MIXTURE OF CARBON MONOXIDE AND HYDROGEN
Filed April 8, 1938   2 Sheets-Sheet 2
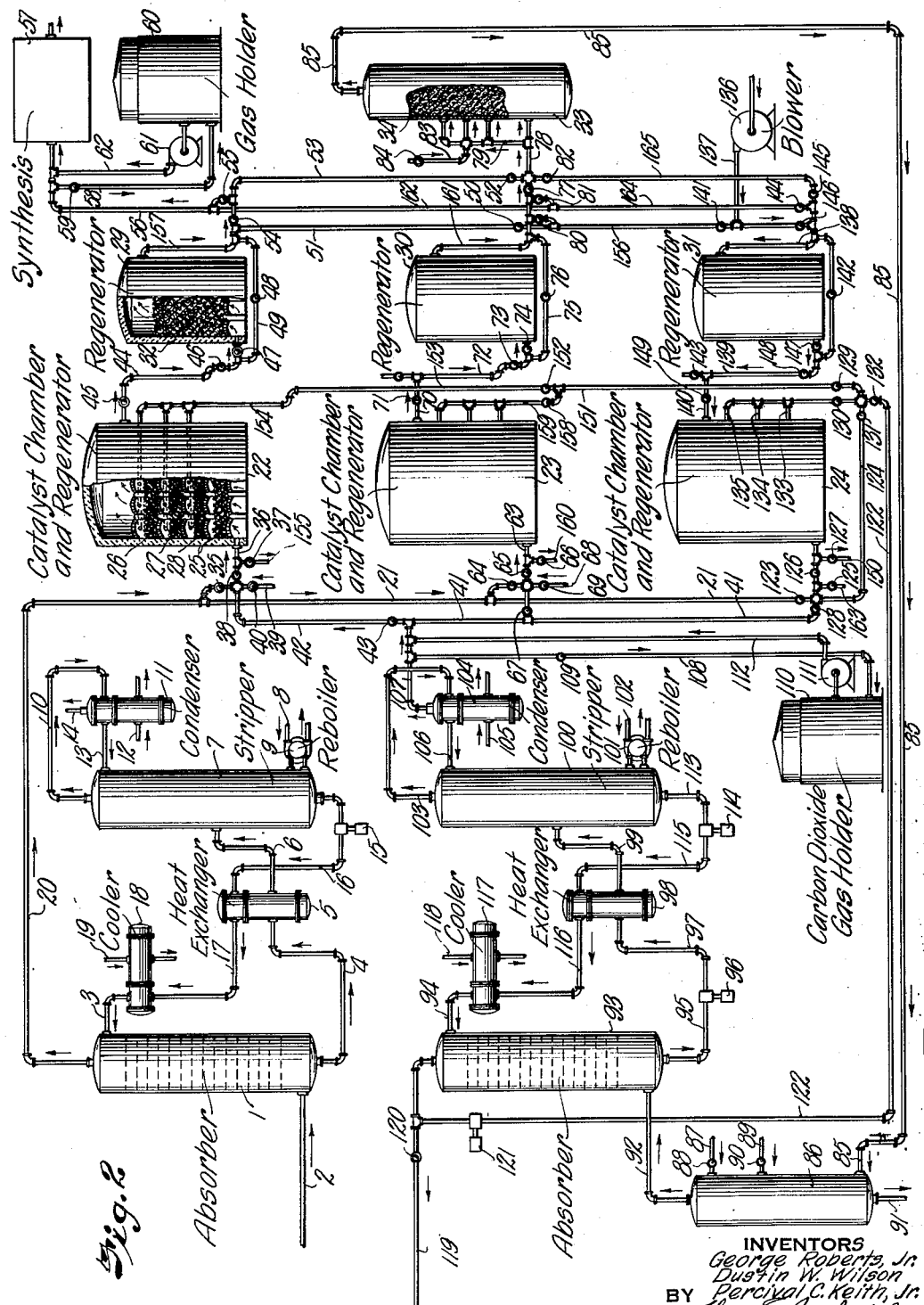
INVENTORS
George Roberts, Jr.
Dustin W. Wilson
BY Percival C. Keith, Jr.
ATTORNEY Patented Apr. 23, 1940

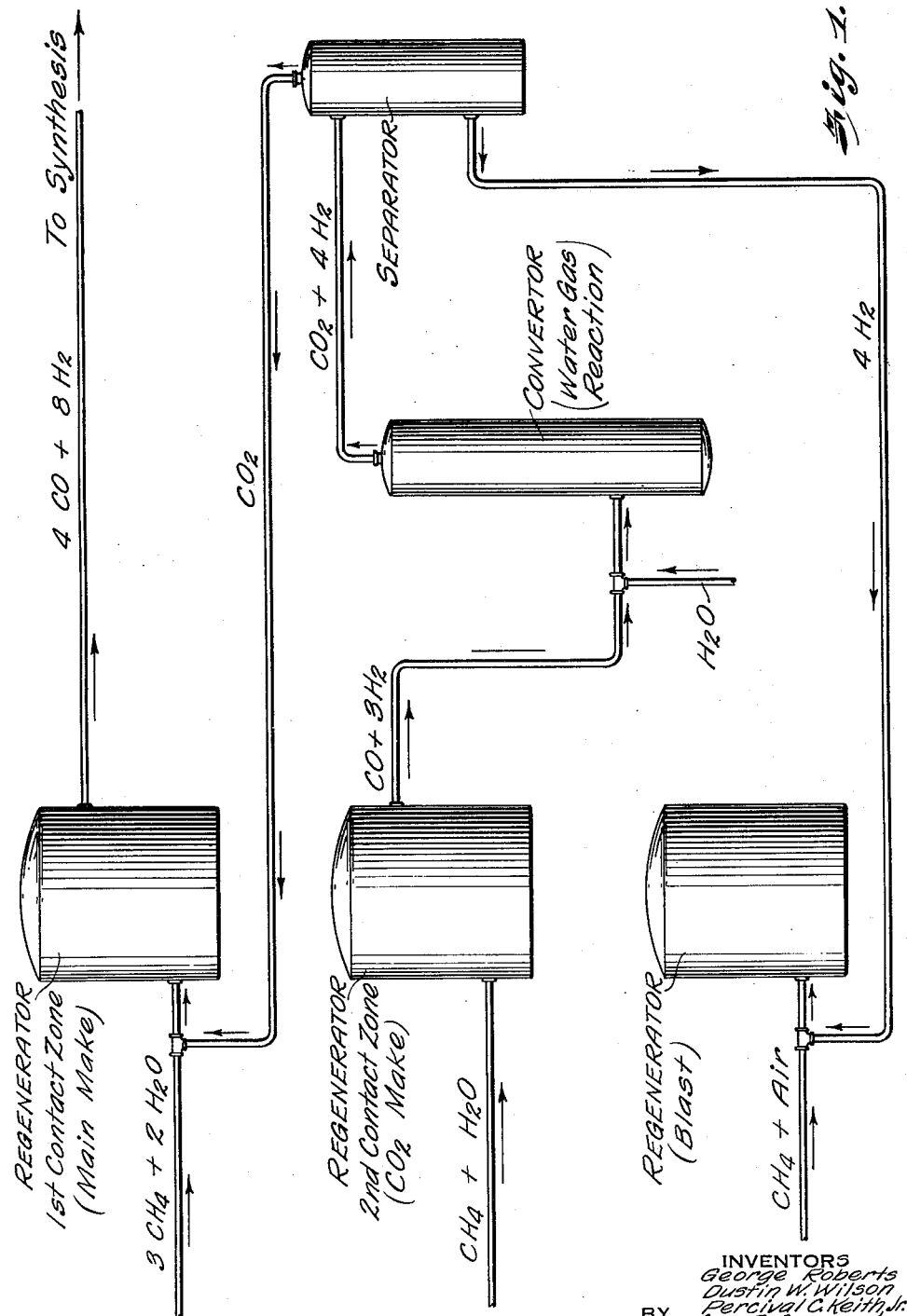

2,198,553

UNITED STATES PATENT OFFICE 2,198,553

METHOD OF MAKING A SYNTHESIS GAS MIXTURE OF CARBON MONOXIDE AND HYDROGEN

George Roberts, Jr., Montclair, N. J., Dustin W. Wilson, Scarsdale, N. Y., and Percival C. Keith, Jr., Peapack, N. J., assignors to The M. W. Kellogg Company, New York, N. Y., a corporation of Delaware Application April 8, 1938, Serial No. 200,930

7 Claims. (Cl. 23—7)

Our invention relates to a method of making synthesis gas and more particularly to a method of making a mixture of hydrogen and carbon monoxide having a controllable ratio of hydrogen with respect to carbon monoxide from 1:1 to 3:1 by volume.

Mixtures of carbon monoxide and hydrogen are useful in synthesizing many organic compounds and these mixtures are known to the art as "synthesis gas". Synthesis gas may be made from methane, steam and carbon dioxide, according to the following reaction:

$$3CH_4 + CO_2 + 2H_2O \rightarrow 4CO + 8H_2$$

The above mixture, it will be observed has a ratio of carbon monoxide to hydrogen as 1:2.

Methane and carbon dioxide form a mixture of carbon monoxide and hydrogen as follows:

$$CH_4 + CO_2 \rightarrow 2CO + 2H_2$$

It will be observed that, in the above mixture of carbon monoxide and hydrogen we have a ratio of carbon monoxide to hydrogen as 1:1.

Methane and steam will form a mixture of synthesis gas as follows:

$$CH_4 + H_2O \rightarrow CO + 3H_2$$

It will be observed that, in the above synthesis gas mixture, the ratio of carbon monoxide to hydrogen is as 1:3.

Any ratio of carbon monoxide and hydrogen may be obtained between the limits indicated above by varying the relative proportions of carbon dioxide and steam which are reacted with methane. In this manner, we are enabled to control the relative proportions of carbon monoxide and hydrogen in the synthesis gas being produced by our method.

The instant invention relates to a method of producing synthesis gas according to the above reactions in which methane is obtained from natural gas wells or any other suitable source and steam may be obtained as a by product from the liquid conversion synthesis or from any other suitable source. The carbon dioxide is obtained by the reaction of methane and steam to form a mixture of carbon monoxide and hydrogen with the subsequent conversion of the carbon monoxide to carbon dioxide by the water gas reaction as follows:

$$CO + H_2O = CO_2 + H_2$$

For convenience, we will refer to the hydrocarbon gas as methane but it is to be understood that any suitable light hydrocarbon gases such as ethane, propane, ethylene, propylene, may be used.

One object of our invention is to provide a novel process for forming synthesis gas from light hydrocarbon gases.

Our invention provides a method of converting light hydrocarbon gases into a mixture containing CO and $H_2$ in which carbon monoxide is converted into carbon dioxide for use in the conversion of the hydrocarbon gases to synthesis gas by the general water gas reaction.

Other and further objects of our invention will appear from the following description.

In the accompanying drawing, Fig. 1 is a diagrammatic flow sheet showing the flow of gas through our process.

Fig. 2 is a diagrammatic view of one form of apparatus capable of carrying out the method of our invention.

Referring now to Fig. 2, methane from any suitable source, which may be for example under a pressure of 400 pounds per square inch and at a temperature of 100° F. is introduced into an absorber 1 through a line 2. The absorber 1 may be a bubble tower or a packed tower into which any suitable hydrogen sulphide absorbent such as monoethanol-amine or triethanol-amine is introduced through line 3. Hydrogen sulphide must be removed from the methane since it will poison the catalyst in the subsequent liquid conversion step, that is, the synthesis step in which the synthesis gas is converted into useful organic compounds. The menstruum containing absorbed hydrogen sulphide is removed from the absorber 1 through line 4 and flows under pressure in the absorber through heat exchanger 5, through line 6 into the stripping tower 7 in which the hydrogen sulphide is distilled from the menstruum by heat of steam introduced through line 8 into a reboiler 9. The vapors and hydrogen sulphide pass overhead from the stripping tower 7 through line 10 and are condensed in condenser 11 by a cooling medium introduced through line 12. The condensate returns through line 13 to the tower 7 as reflux and the hydrogen sulphide is removed through line 14. The stripped menstruum is pumped by pump 15 through pipe 16, through heat exchanger 5, through pipe 17 through auxiliary cooler 18 to line 3 for reuse in the absorber, a cooling medium being supplied cooler 18 through line 19. The methane, with hydrogen sulphide removed, leaves the absorber through line 20 and passes into a manifold 21.

The chambers 22, 23, and 24 are similar in construction and comprise casings containing a regenerator bed 25 of crushed refractory material or the like and catalyst beds 26, 27, and 28. The catalyst may comprise refractory material upon which has been deposited metallic nickel or the like. Any suitable catalyst for the conversion of methane into synthesis gas may be employed. Such a catalyst may be prepared by saturating a difficultly reducible oxide with nickel nitrate, drying the mixture, roasting it to decompose the nickel nitrate into nickel oxide, and reducing it to convert nickel oxide into metallic nickel.

The chambers 29, 30, and 31 are similar in construction and comprise regenerator beds 32 composed of crushed refractory material or the like.

It will be noted that there are three sets of catalyst and regenerator chambers. The arrangement is such that when one set is on the synthesis gas make, another set is being regenerated and the third set is on the carbon dioxide make so that the process may be operated substantially continuously.

The carbon dioxide converter comprises chamber 33 which contains the catalytic bed 34 which may be any suitable catalyst capable of converting carbon monoxide to carbon dioxide in the presence of steam. A suitable catalyst would be a nickel catalyst though it is to be understood that any other catalyst known to the art may be employed in the catalyst bed 34.

In the drawing, chamber 22 is on the synthesis gas make cycle, chamber 23 is on the carbon dioxide make cycle, and chamber 24 is on the heating or regenerative cycle. The conversion of methane into synthesis gas takes place in the presence of the catalyst between temperatures of approximately 1800° F. and 2200° F. Purified methane from manifold 21 passes valve 35 and flows into catalyst chamber 22 through line 36, valve 37 being closed and valve 38 being open. Steam from any suitable source is introduced into the pipe 36 through pipe 39 controlled by valve 40. Carbon dioxide from carbon dioxide manifold 41 passes into the catalyst chamber 22 along with the steam and the methane, through pipe 42 controlled by valve 43. The mixture of methane, carbon dioxide and steam is converted into synthesis gas and passes from the catalyst chamber 22 through line 44 controlled by valve 45 and past valves 46 and 47 into the regenerator chamber 29, valve 48, controlling bypass line 49, being closed.

Some of the heat of the hot freshly formed synthesis gas is stored in the refractory bed 32 where it will be recovered for preheating the air during the heating or regenerative cycle. When catalyst chamber 22 is on the make cycle, valve 50 controlling line 51, is closed. Valve 52 controlling line 53 is closed while valve 54 and valve 55 are open so that the synthesis gas will pass through pipe 56 to the synthesis zone 57 in which the synthesis gas is converted to useful organic compounds. Any desired amount of the synthesis gas may pass through pipe 58, controlled by valve 59 into the gas holder 60, whence it may be removed by a blower or compressor 61 for passage through pipe 62, when desired for use.

Methane from manifold 21 passes into catalyst chamber 23, through pipe 63, past valves 64 and 65, valve 66 being closed. Valve 67 is closed and steam passes into pipe 63 along with the methane being introduced through pipe 68 past valve 69. The steam and methane will react to form a gaseous mixture containing CO+H₂, according to the following reaction:

$$CH_4 + H_2O \rightarrow CO + 3H_2$$

This reaction is during the CO₂ make cycle. Chamber 23 has just been taken off the synthesis gas make. It is so taken off when the catalyst chamber has cooled to approximately 1800° F. When this temperature is reached, valve 67 controlling the CO₂ used during the synthesis gas make is closed so that only steam and methane continue to be passed into the catalyst chamber 23. The flow of steam and methane to chamber 23 is continued until the temperature leaving the catalyst mass falls to approximately 1600° F., below which temperature insufficient yields will result.

The gaseous mixture leaves chamber 23 through pipe 70, controlled by valve 71 and passes into pipe 72. Valve 73 is open but valve 74 is closed, the gaseous mixture passing through bypass line 75 controlled by valve 76, past valve 77 into line 78 and into manifold 79, whence the gases pass into the chamber 33, it being understood that valves 80, 81, and 82 are closed. The gaseous mixture containing carbon monoxide is joined by steam or water introduced into the manifold 79 through pipe 83 controlled by valve 84. In chamber 33, the carbon monoxide and steam react as pointed out above in the general water gas reaction, producing hydrogen and carbon dioxide. The reaction is exothermic at reaction temperature and the flow is such that the gases leaving the chamber 33 through pipe 85 will be at a temperature in the vicinity of 850° F. to 950° F. The mixture containing carbon dioxide and hydrogen passes through pipe 85 into a water cooling tower 86 into which water is introduced through pipe 87 controlled by valve 88 and pipe 89 controlled by valve 90, the water being withdrawn through pipe 91. The cooled carbon dioxide and hydrogen mixture will leave the cooling tower 86 through pipe 92 and pass into an absorbing tower 93 which may be of any suitable type such as a packed tower or bubble tray tower. A carbon dioxide absorbing menstruum such as monoethanol-amine or any other suitable solution for removing carbon dioxide is introduced into the absorbing tower through pipe 94 and will absorb the carbon dioxide from the gaseous mixture rising upwardly through the absorber. The rich menstruum is removed from the absorber 93 through pipe 95 and pumped by pump 96 through pipe 97 through heat exchanger 98, through pipe 99 into the still or stripper 100 in which the carbon dioxide is distilled from the absorbing medium by steam introduced into reboiler 101 through pipe 102. The vapors rise upwardly and are removed from the stripper through pipe 103 and pass through condenser 104 which is supplied with a cooling medium through pipe 105. The condensate returns to the stripper 100 through pipe 106 as reflux and the carbon dioxide gas is removed through pipe 107 and passed to the carbon dioxide manifold 41. Any desired amount of carbon dioxide may pass through pipe 108 which is controlled by valve 109 into a carbon dioxide gas holder 110 from which it may be withdrawn by blower, compressor 111, an injector or any other suitable means for passage through pipe 112 into the carbon dioxide manifold 41. The lean menstruum is withdrawn from the stripping tower through pipe 113 and is pumped by pump 114 through pipe 115, through heat exchanger 98, through pipe 116, through cooler 117 which is supplied by a cooling medium through pipe 118, through pipe 94, for reuse.

The tail gas from the absorber will comprise largely hydrogen. It may be removed through pipe 119 controlled by valve 120 and passed to a holder for use for hydrogenation or other purposes. If desired, a portion of the residual gas may be pumped by pump 121 or flow under its own pressure through line 122 for use as a fuel gas during the heating step.

The catalyst chamber 24 in the drawing is on the heating or regenerative cycle. Methane from the methane manifold 21 passes valve 123 into pipe 124, it being understood that valves 125, 126, and 128 are closed and valve 127 is open. Valve 129 is closed and valves 130 and 131 are open. If hydrogen is being recycled for fuel, valve 132 is also open. The methane and hydrogen in the heating cycle are used as fuel and have passed to burners disposed around the catalyst mass within chamber 24 through pipes 133, 134, and 135. Air to support the combustion is furnished by a blower or compressor 136 and passes through pipe 137, through pipe 138, through regenerator chamber 31, through pipe 139, through pipe 140 into the catalyst chamber 24. It is understood, of course, that valves 141, 142, and 143, 144 and 145 are closed while valves 146, 147, 148 and 149 are open. The gases of combustion pass to a stack through pipe 150 controlled by valve 127.

It will be readily observed that the sequence of operations for any one chamber are heating cycle, gas synthesis cycle, and CO₂ make cycle. In the drawing, catalyst chamber 22 being on the synthesis gas cycle, will next be put on the CO₂ make cycle. Chamber 23 being on the CO₂ make cycle will next be put on the heating cycle. Chamber 24 being on the heating cycle will next be put on the synthesis gas make cycle.

Fig. 1 shows the sequence of operations with chamber 22 on the main make cycle, chamber 23 on the CO₂ make cycle and chamber 24 on the heating or blast cycle.

It will be observed that the arrangement is such that any one of the catalyst chambers 22, 23, or 24 may be put on any one of the three cycles. Taking chamber 22, it has already been described with reference to the synthesis gas make cycle. In order to put this chamber on the CO₂ make cycle, the valve 43 controlling the carbon dioxide is closed, shutting off the carbon dioxide supply. The valve 47 is closed and the valve 48 is opened, bypassing the regenerator 29. The valve 55 is closed to permit the synthesis gas to pass into pipe 53. Valve 52 is opened to permit the synthesis gas to pass to the carbon dioxide make chamber 33.

When chamber 22 is on the heating cycle, valve 129 is opened to permit fuel gas to flow through pipe 151, past valve 152, through pipe 153 to manifold 154. The flue gases leave through pipe 155. Air is supplied past valve 141 through pipe 156, past valve 50, through pipe 51, through pipe 157, through regenerator 29 and pipe 44.

Chamber 23 has been described with respect to the CO₂ make cycle. To place chamber 23 on the heating cycle, fuel is supplied through pipe 124, valve 131, valve 129, pipe 151, valve 158 and manifold 159, flue gases being withdrawn from chamber 23 through pipe 160. Air is supplied from pipe 137 through valve 141, pipe 156, valve 80, pipe 161, regenerator 30, valve 74, valve 73, pipe 72, valve 71, and pipe 70.

In order to place chamber 23 on the synthesis gas make cycle, valve 67 is opened to supply CO₂ from the manifold 41, steam and methane being supplied as in the case of the CO₂ make cycle. The synthesis gas on the make cycle is passed through the regenerator 30 by opening valve 74 and closing valve 76, and the synthesis gas is passed to the synthesis stage by closing valve 77 and opening valve 81 to permit the synthesis gas to flow through pipe 162 and pipe 56 to the synthesis gas stage or the gas holder 60.

Catalyst chamber 24 is put on the synthesis gas cycle by supplying carbon dioxide from manifold 41 through valve 128. Methane is supplied from pipe 21 through valve 123. Steam is supplied through pipe 163 controlled by valve 125. The synthesis gas passes from the catalyst chamber through pipes 140 and 139, through regenerator 31 from whence it is withdrawn through pipe 138 passing through pipe 164 via valve 144, pipe 162, pipe 56, into the synthesis gas stage.

When chamber 24 is on the CO₂ make cycle, the valve 128 controlling the supply of carbon dioxide is closed. The regenerator is bypassed by closing valve 147 and opening valve 142 and the synthesis gas is passed through pipe 165 by opening valve 145, valve 144 being closed. The synthesis gas will then flow past valve 82 into manifold 79 via pipe 78.

In the detailed description of the method of operating the combination catalyst chamber and regenerator, the temperature is described as varying between 1800° F. and 2200° F. Under certain conditions we may prefer to vary these temperatures somewhat to have the extremes of the operating cycle anywhere between 1500° F. and 2500° F.

It will be observed that we have accomplished the objects of our invention. We have provided a simple, economical and expeditious manner of forming synthesis gas from hydrocarbon gases using only hydrocarbon gases and steam as raw materials. Our operation is flexible and substantially continuous by the use of three sets of units.

By way of illustration and not by way of limitation, 24,000,000 cubic feet of natural gas was charged into the hydrogen sulphide scrubber at a pressure of about 400 pounds per square inch and at a temperature of 60° F. The gas contained about 700 grains of hydrogen sulphide per 100 cubic feet of gas which was completely removed in passing through the absorber. The hydrogen sulphide bearing solution left the bottom of the absorber under its own pressure and flowed through heat exchanger 5 where it was heated to a temperature of about 185° F. and then into the stripper 7. Steam was used as a stripping medium and was introduced into the reboiler 9. About 265,000 cubic feet of hydrogen sulphide per day left the top of the tower. About 65 gallons per minute of the absorbing solution of monoethanol amine (sodium phenolate can also be used) was required to absorb the hydrogen sulphide. About 3800 pounds of steam per hour were required for the stripping operation.

The purified gas flowed into the regenerator and catalyst chamber which was on the make cycle where it was converted to hydrogen and carbon monoxide. In the example illustrative of a typical run, the synthesis gas mixture formed contained carbon monoxide and hydrogen in a ratio of two parts hydrogen to one part carbon monoxide by volume. About 61,000,000 cubic feet of synthesis gas per day was formed. This quantity of synthesis gas passing to the liquid synthesis step formed approximately 13,000 barrels per day of hydrocarbon liquid. It is to be understood, of course, that the quantity of liquid produced may be very much higher or very much lower, depending upon the condition of the catalyst and the particular catalyst used in the synthesis step.

The tail gas from the liquid synthesis step was partially recycled and partially burned as a fuel. In the regenerator which is on the make cycle, when the gas temperature leaving the catalyst mass fell to about 1800° F. the flow of carbon dioxide was discontinued and approximately 8,000,000 cubic feet per day of natural gas and about 31,000 pounds per hour of steam were introduced to the regenerator. These materials reacted to produce a gas containing three parts hydrogen to one part carbon monoxide in a quantity of about 38,000,000 cubic feet per day. In the conversion of carbon monoxide to carbon dioxide about 35,000 pounds per hours of steam is passed over the catalyst. The conversion took place at about 850° F. The conversion reaction is exothermic and liberated about 9,000,000 B. t. u. per hour. The gas from this step was cooled and most of the steam contained was condensed. The remainder of the gas was passed to the carbon dioxide recovery plant to which was fed about 39,000,000 cubic feet of gas per day, from which amount about 6,000,000 cubic feet of gas per day, comprising carbon dioxide, was recovered.

When the regenerators of the carbon dioxide make cycle reached a gas temperature of 1600° F. from the catalyst mass, the flow of reactants was stopped and the regenerator placed upon the blast cycle. In the blast cycle, about 120,000,000 cubic feet per day of air was introduced to support the combustion of the tail gas from the carbon dioxide absorber, which amounted to about 33,000,000 cubic feet of gas per day. This gas was predominantly hydrogen. Auxiliary natural gas to the extent of about 2,300,000 cubic feet per day was introduced as fuel during the make cycle, the flue gas leaving the regenerator at a temperature of about 1200° F. being passed to a stack.

It will be understood that certain features and subcombinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a method of producing a synthesis gas mixture of carbon monoxide and hydrogen in a catalytic contact zone in which a mixture of hydrocarbon gas, steam, and carbon dioxide is converted into synthesis gas in the presence of a catalyst between temperatures of 2200° F. and 1800° F., the step of simultaneously converting, by the water gas reaction, a gaseous mixture containing carbon monoxide and hydrogen into carbon dioxide and hydrogen, separating the hydrogen from the carbon dioxide and employing the separated carbon dioxide as the carbon dioxide being passed to the catalytic contact zone.

2. A method of producing a synthesis gas mixture of carbon monoxide and hydrogen in a plurality of catalytic contact zones, including the steps of introducing a mixture of carbon dioxide, steam and a hydrocarbon gas into a first contact zone and there converting the mixture into synthesis gas between temperatures of 2200° F. and 1800° F., simultaneously introducing steam and a hydrocarbon gas into a second catalytic contact zone and there forming a gaseous mixture containing carbon monoxide and hydrogen at temperatures between 1800° F. and 1600° F., admixing steam with said gaseous mixture formed in the second zone and converting the carbon monoxide present to carbon dioxide by the water gas reaction, separating the carbon dioxide from the hydrogen and passing the carbon dioxide to the first catalytic contact zone as the carbon dioxide used in the process.

3. A method of producing a synthesis gas mixture of carbon monoxide and hydrogen in a plurality of catalytic contact zones, including the steps of introducing a mixture of carbon dioxide, steam and a hydrocarbon gas into a first contact zone and there converting the mixture into synthesis gas between temperatures of 2200° F. and 1800° F., simultaneously introducing steam and a hydrocarbon gas into a second catalytic contact zone and there forming a gaseous mixture containing carbon monoxide and hydrogen at temperatures between 1800° F. and 1600° F., admixing steam with said gaseous mixture formed in the second zone and converting the carbon monoxide present to carbon dioxide by the water gas reaction, separating the carbon dioxide from the hydrogen, passing the carbon dioxide to the first catalytic contact zone as the carbon dioxide used in the process, simultaneously with the above steps burning a fuel within a third catalytic contact zone to heat the same from 1600° F. to 2200° F. and alternating said zones so that each of said respective zones is successively operated in carrying out the first synthesis gas formation step, the carbon dioxide formation step and the heating step.

4. A method as in claim 3 in which the separated hydrogen is passed to the heating step as a portion of the fuel being burned.

5. A method of producing a synthesis gas mixture of carbon monoxide and hydrogen in a plurality of catalytic contact zones, including the steps of subjecting a hydrocarbon gas to desulphurizing treatment, forming a mixture of said desulphurized hydrocarbon gas, carbon dioxide and steam, introducing said mixture into a first contact zone and there converting the mixture into synthesis gas between temperatures of 2200° F. and 1800° F., simultaneously introducing steam and a hydrocarbon gas into a second catalytic contact zone and there forming a gaseous mixture containing carbon monoxide and hydrogen at temperatures between 1800° F. and 1600° F., admixing steam with said gaseous mixture formed in the second zone and converting the carbon monoxide present to carbon dioxide by the water gas reaction, separating the carbon dioxide from the hydrogen and passing the carbon dioxide to the first catalytic contact zone as the carbon dioxide used in the process.

6. A method of producing a synthesis gas mixture of carbon monoxide and hydrogen in catalytic contact zones operated successively on blast, main make, and carbon dioxide make cycles, the blast cycle comprising burning fuel with air to raise the temperature of a contact zone from 1600° F. to 2200° F., the main make cycle comprising subjecting a mixture of hydrocarbon gas, steam and carbon dioxide to catalytic conversion at temperatures between 2200° F. and 1800° F.

the carbon dioxide make cycle comprising catalytically converting a hydrocarbon gas and steam into a mixture of carbon monoxide and hydrogen at temperatures between 1800° F. and 1600° F., the carbon dioxide make cycle having been previously operated on the main make cycle, withdrawing a gaseous mixture containing carbon monoxide and hydrogen and converting the carbon monoxide present to carbon dioxide with the aid of steam in the presence of a catalyst by the water gas reaction, separating the hydrogen from the carbon dioxide, employing the separated carbon dioxide as the carbon dioxide used in the process and successively operating respective zones in the aforementioned sequence to effect substantially continuous operation.

7. A method as in claim 2 in which said hydrocarbon gas comprises largely methane.

GEORGE ROBERTS, Jr.
DUSTIN W. WILSON.
PERCIVAL C. KEITH, Jr.